Patented Apr. 1, 1930

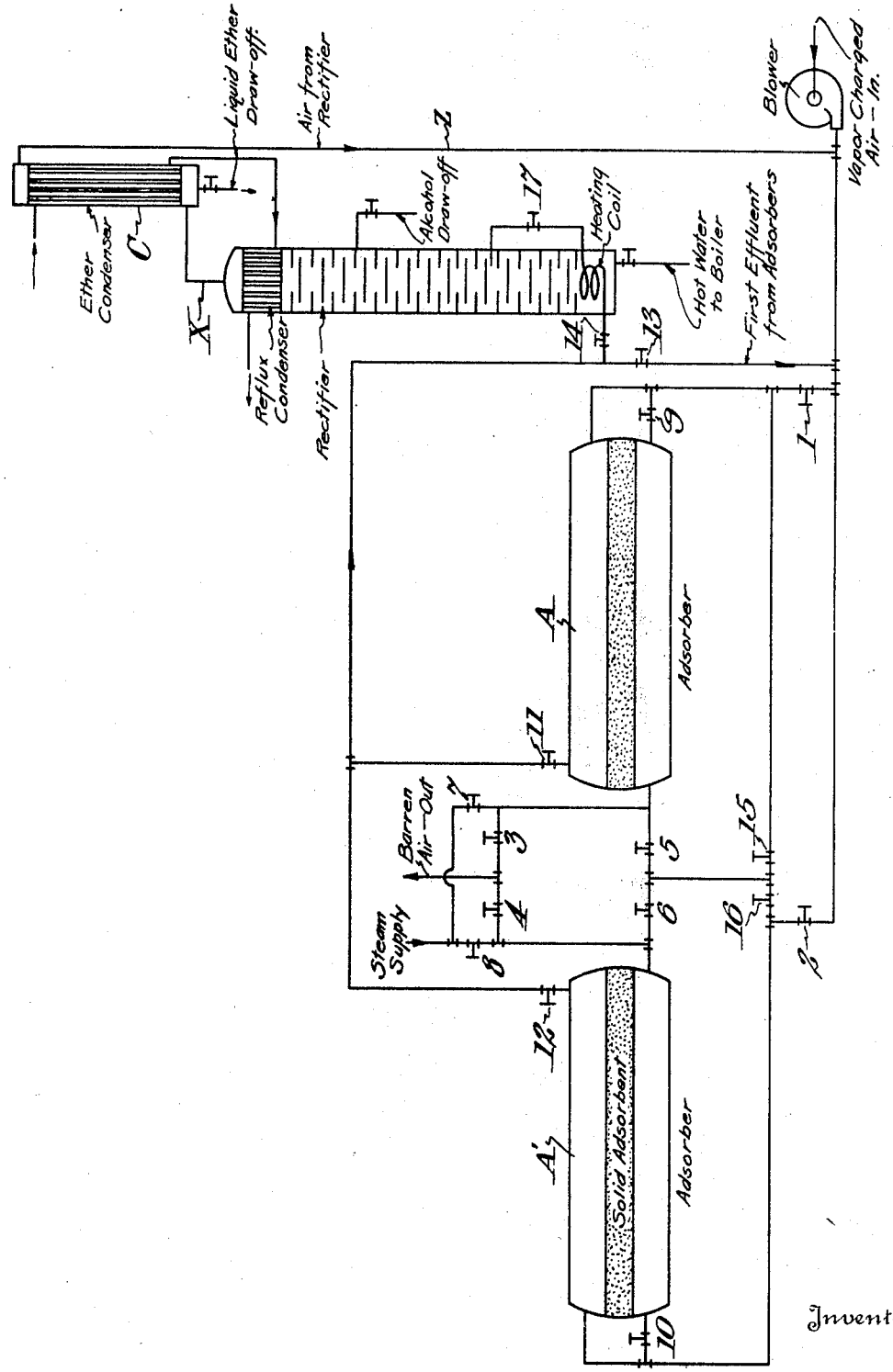

1,753,067

UNITED STATES PATENT OFFICE

ARTHUR B. RAY, OF BAYSIDE, AND GEORGE T. FELBECK, OF MOUNT VERNON, NEW YORK, ASSIGNORS TO CARBIDE AND CARBON CHEMICALS CORPORATION, A CORPORATION OF NEW YORK

RECOVERY OF ADSORBABLE SUBSTANCES

Application filed May 26, 1926. Serial No. 111,800.

The invention relates to the recovery of valuable substances from mixtures containing air or other gases which condense much less readily than the substance to be recovered. The process of the invention is particularly applicable to the treatment of the dilute gaseous mixtures which are formed by the evaporation of solvents in such industries as the manufacture of artificial silk or leather. The valuable material is caused to be adsorbed on an active adsorbent, such as the activated carbon described and claimed in Patents 1,497,543 and 1,497,544 granted to N. K. Chaney, and the adsorbed material is expelled by heating. When the adsorbent is heated by applying steam directly to it, a mixture results which contains water and the substance to be recovered. Such mixture is initially at least partially vaporous and can of course be condensed by cooling it, and unless the valuable substance is immiscible with water further steps will usually be required to dehydrate the valuable substance. In many cases rectification may be used with advantage for this separation.

The accompanying drawing shows diagrammatically an apparatus suitable for the recovery of ether, or both alcohol and ether, from the air which is circulated through the spinning machines in the manufacture of artificial silk by a process now in extensive use. This air contains both alcohol and ether, the concentration of the latter being higher.

The principal items of apparatus, aside from piping and valves, are the adsorbers A and A', the rectifying column, and the ether condenser. Air is drawn through the spinning machines and forced through the recovery apparatus by a blower of any suitable type.

The adsorbers may be horizontal cylinders of boiler plate with the carbon or other solid adsorbent disposed therein in a horizontal layer supported by a suitable foraminous structure. The layer or bed of adsorbent is also covered with a foraminous cover to prevent its being displaced by the rapid current of air passing through the adsorber in the course of the process, it being evident that any displacement may result in the formation of thin spots or channels in the absorbent and thus diminish the efficiency of the apparatus.

The thickness of the layer of adsorbent is preferably only a small fraction of the diameter of the enclosing cylinder, so that large gas spaces are provided above and below the adsorbent bed. This insures even distribution of the gas current through the adsorbent and avoids the necessity for special distributors for the gas. A layer of carbon two feet in thickness centrally disposed in a cylinder ten feet in diameter and thirty-five feet long has given excellent results.

At least two adsorbers are preferably provided in order that one may be available for adsorption while the other is being relieved of its adsorbed material, cooled, and prepared for reuse. The gas current is then diverted from the laden to the fresh adsorber and the former is discharged, thus providing continuous treatment of the gas stream with the individual adsorbers operating in cycles.

Let it be assumed that adsorber A' has reached the practical limit of its capacity and that adsorber A is in use. Valves 1 and 3 are open, all other valves being closed, and the mixture of air, alcohol and ether is passing downwardly through the adsorbent in A, the air freed from the alcohol and ether escaping at the place indicated on the drawing.

Valves 8, 10, 12, and 13 are then opened and steam entering the system as indicated is admitted to adsorber A'. At this stage the upper gas space of adsorber A' is filled with air containing solvent vapors while the lower gas space is filled with barren air. As already stated these gas spaces are of large volume and if the large amount of air contained in them were to be passed to the rectifier the operation of the latter would be greatly disturbed. Accordingly we have provided means whereby a large proportion of this air may be diverted from the rectifier, its content of valuable vapors being nevertheless recovered. Furthermore, the removal of the air from the gas spaces is effected without substantially increasing its content of valuable vapors as would be the result if the air were merely blown out with steam passing through the bed of adsorbent.

To attain the object just referred to steam is blown through the gas spaces of the laden adsorber in series, but is so bypassed that it does not flow through the adsorbent in going from the lower space to the upper. The bypass is controlled by valve 10 and when this is open the mixture of steam, air, and solvent vapors flows through the bypass instead of through the adsorbent bed because of the greater resistance of the latter. We have found it possible by this means to remove a large proportion of the air without heating the adsorbent sufficiently to cause it to give up considerable quantities of adsorbed material. After traversing the upper gas space of the adsorber the mixture leaves by way of valve 12, and enters the line passing to the rectifier. This line being closed off by valve 14, the mixture is caused to pass through valve 13 into the line carrying vapor-charged air to the adsorbers. This insures the recovery of its adsorbable constituents and the whole procedure is so designed that the adsorbers are as far as possible released from the burden of readsorbing material previously taken up by them. Under some conditions it is undesirable to pass the mixture leaving the adsorber during the purging operation directly to the line carrying the vapor-laden air to the adsorbers, and is preferable to interpose a cooler to condense and eliminate a portion of the container water vapor. It is obvious that the purging of air from the gas spaces could also be attained by providing steam inlets and outlets in both upper and lower gas spaces so that the residual air could be blown out without passing steam through the adsorbent bed, but the method shown is simple and effective. The gas spaces can also be cleared of air by drawing a vacuum on the adsorber. By withdrawing the air from below the adsorbent layer no air would be removed which had not passed through the adsorbent and given up its content of valuable vapors. The gases withdrawn by evacuation can be returned to the intake side of the adsorbers or, if sufficiently free from valuable material, can be discarded.

When the bulk of the air has been disposed of by displacement with steam and ether vapor begins to be freely evolved from the adsorbent, the positions of valves 10, 13, and 14 are reversed and the mixture of steam and solvent vapors carrying only a little air is passed to suitable condensing, rectifying, or other separating apparatus. The nature of this apparatus will vary widely depending on the vapors to be recovered. We have illustrated apparatus suitable for the recovery of alcohol and ether, which apparatus involves as a novel feature arrangements whereby the mixture can be rectified with sufficiently complete separation of the water, alcohol and ether by using only the heat of the steam leaving the adsorbers.

For this purpose the hot mixture is passed through a coil contained in the kettle of an efficient rectifying column. Some of the mixture in the coil is liquefied and both liquid and vapor are discharged through valve 17 into the column at an appropriate point which is preferably somewhat above its bottom. A condenser at the top of the column gives the necessary reflux for rectification, and only ether and the small quantity of air entering the column are permitted to pass through. Hot water is drawn off from the kettle of the column and may be returned to the boilers. The alcohol may be drawn off at an intermediate height from a properly constructed column. The mixture of ether and air leaving the reflux condenser flows through pipe X to condenser C which is held at a low temperature to condense most of the ether, the latter being drawn off as indicated. The air carrying a little ether is returned to the intake side of the adsorbers through line Z. Cooling medium may be passed through the ether condenser and the reflux condenser in series as shown, or in any other way adapted to maintain them at the respective suitable temperatures. The procedure described above is not dependent on the use of a solid adsorbent but is applicable where any type of sorbent, either solid or liquid, is used for collecting the valuable material.

Specific procedure for the recovery of the valuable components from the mixture distilled out of the adsorbent has been described only for purposes of illustration. Many changes are possible and will be necessary to conform to the requirements in particular installations. Thus the mixture may be passed first to a condenser where more or less of the water vapor is liquefied, only the vaporous residue from this condenser passing to the rectifying apparatus. The quantity of steam contained in the effluent from the adsorbers may be either greater or less than that required to furnish heat for the rectification, in which case the excess heat may be dissipated or additional heat may be provided from auxiliary sources in ways which will suggest themselves to those skilled in rectification. Also, instead of a single rectifying column, it is obvious that two or more may be used.

After adsorber A' has been sufficiently stripped by steaming, it is cooled in order to prepare it for reuse. If activated carbon prepared by the Chaney process is used as the adsorbent it is not necessary to dry it as it is effective even when water-saturated, but the procedure to be described is a desirable one and dries the carbon to some extent. It consists in passing barren air leaving adsorber A through the adsorbent in A'. When only two adsorbers are used it is necessary that the steaming be only of such duration that the adsorbent can be cooled thereafter before the companion adsorber is fully charged. This is readily accomplished, since a fresh adsorber can be used for a prolonged period, for example two hours, before any vapors break through. When the steaming is finished valves 3, 8, and 12 are closed and valves 4, 5, and 16 are opened. The air then passes through the two adsorbers in series before being discharged. This mode of operation has the advantage that it permits the adsorbers to be more heavily charged with valuable vapors without losing any of the latter. The tendency of solvent vapors to pass the adsorbent is of course greatest toward the end of the adsorption period. At this time the outgoing vapors are passing through another adsorber which has been stripped of solvent vapors. As the first of the two adsorbers is nearing its break-point the second is approaching maximum activity since it has by that time been completely cooled by the air current. Accordingly any solvent vapors leaving the first adsorber are caught in the second, and none are lost. At the end of the cycle the valves are set to pass vapor-bearing air to adsorber A' and to steam out and recover the adsorbed material from A in the manner which has already been described.

We claim:

1. The process of recovering condensible vapor from a mixture containing non-condensible gas, which comprises flowing the mixture through a bed of solid absorbent and a gas space adjacent thereto, whereby condensible vapor is taken up by the absorbent; interrupting the current; clearing said gas space of non-condensible gas by flowing condensible vapor through said space, but not through the absorbent; and then distilling vapor from the absorbent into said space, and withdrawing it from said space substantially free from non-condensible substances.

2. The process of recovering condensible vapor from a mixture containing non-condensible gas, which comprises flowing the mixture successively through a first gas space, a bed of solid absorbent, and a second gas space, whereby condensible vapor is taken up by the absorbent; interrupting the current; clearing said gas spaces of non-condensible gas by flowing condensible vapor through them, but not through the absorbent; and then distilling vapor from the absorbent into one of said spaces, and withdrawing it therefrom substantially free from non-condensible substances.

3. The process of recovering vapor from air which comprises flowing the vapor-laden air through a bed of solid absorbent and a gas space adjacent thereto, whereby vapor is taken up by the absorbent; interrupting the current; clearing said gas space of air by flowing steam through said space but not through the absorbent; and then distilling vapors from the absorbent into said space and withdrawing it therefrom substantially free from air.

4. The process of recovering vapor from air, which comprises flowing the vapor-laden air successively through a first gas space, a bed of solid absorbent, and a second gas space, whereby vapor is taken up by the absorbent; interrupting the current; clearing said gas spaces of air by flowing steam through them, but not through the absorbent; and then distilling vapor from the absorbent into one of said spaces and withdrawing it therefrom substantially free from non-condensible substances.

In testimony whereof, I affix my signature.
ARTHUR B. RAY.
In testimony whereof, I affix my signature.
GEORGE T. FELBECK.